United States Patent
Zhao

(10) Patent No.: US 9,689,758 B2
(45) Date of Patent: Jun. 27, 2017

(54) SOLAR BATTERY WIRELESS LOAD CELL

(71) Applicant: BODE ENERGY EQUIPMENT CO., LTD., Xi'an (CN)

(72) Inventor: Min Zhao, Xi'an (CN)

(73) Assignee: Bode Energy Equipment Co., Ltd., Xi'an (CN)

( * ) Notice: Subject to any disclaimer, the term of this patent is extended or adjusted under 35 U.S.C. 154(b) by 491 days.

(21) Appl. No.: 14/272,105

(22) Filed: May 7, 2014

(65) Prior Publication Data

US 2015/0323399 A1 Nov. 12, 2015

(51) Int. Cl.
- *G01L 5/00* (2006.01)
- *G01L 1/22* (2006.01)
- *H02J 7/35* (2006.01)
- *G01L 5/10* (2006.01)

(52) U.S. Cl.
CPC .............. *G01L 1/22* (2013.01); *G01L 1/2218* (2013.01); *G01L 5/102* (2013.01); *H02J 7/35* (2013.01); *Y10T 29/49009* (2015.01)

(58) Field of Classification Search
CPC ......... G01D 21/02; G01L 1/22; G01L 1/2218; G01L 5/0004; G01L 5/102; H02J 7/35
See application file for complete search history.

(56) References Cited

U.S. PATENT DOCUMENTS

| 4,143,546 A | 3/1979 | Wiener |
| 4,390,321 A | 6/1983 | Langlois et al. |
| 4,490,816 A | 12/1984 | Kehl |
| 4,594,665 A | 6/1986 | Chandra et al. |
| 5,182,946 A | 2/1993 | Boughner et al. |
| 5,291,777 A | 3/1994 | Chang et al. |
| 6,114,632 A | 9/2000 | Planas, Sr. et al. |

(Continued)

FOREIGN PATENT DOCUMENTS

| CN | 2714804 Y | 8/2005 |
| CN | 2937474 Y | 8/2007 |

(Continued)

OTHER PUBLICATIONS

PCT Notification of Transmittal of the International Search Report and the Written Opinion of the International Searching Authority dated Feb. 16, 2016 in PCT/CN2015/094959.

(Continued)

*Primary Examiner* — Elias Desta

(74) *Attorney, Agent, or Firm* — Morgan, Lewis & Bockius LLP

(57) ABSTRACT

A load cell for transmitting load data of a polished rod in a rod pump system includes an outer shell having a u-shaped structure with two protrusions, the u-shaped structure configured to receive the polished rod, and the outer shell configured to be positioned between a rod clamp and a clamping bar of the rod pump system. Internal to the outer shell is a load sensor, a load signal processor, a modulator, a battery, and a charger, whereby the load cell measures a load on the polished rod and wirelessly transmits load signal data via a wireless transmitter internal to the outer shell but with an antenna that protrudes from the outer shell. Also internal to the outer shell is a battery which is charged by an external solar panel via the charger. The battery, charger, and solar panel provide power to the load cell.

6 Claims, 10 Drawing Sheets

(56) References Cited

U.S. PATENT DOCUMENTS

| | | | |
|---|---|---|---|
| 6,315,523 B1 | 11/2001 | Mills | |
| 6,576,849 B2* | 6/2003 | Bliss | G01G 23/3735 177/199 |
| 7,219,723 B2 | 5/2007 | Barnes et al. | |
| 7,345,374 B1 | 3/2008 | Jones et al. | |
| 7,513,752 B2 | 4/2009 | Boone et al. | |
| 7,614,357 B2 | 11/2009 | Hernandez et al. | |
| 7,856,727 B2 | 12/2010 | Chiorean et al. | |
| 7,944,369 B2 | 5/2011 | Appleyard et al. | |
| 8,769,839 B1 | 7/2014 | Paesano et al. | |
| 8,780,055 B2 | 7/2014 | Marchand et al. | |
| 8,866,470 B2 | 10/2014 | Taylor | |
| 9,080,438 B1 | 7/2015 | McCoy et al. | |
| 9,255,506 B2* | 2/2016 | Cook | F01N 3/20 |
| 2004/0144529 A1 | 7/2004 | Barnes et al. | |
| 2004/0155860 A1 | 8/2004 | Wenstrand et al. | |
| 2005/0089425 A1 | 4/2005 | Boone et al. | |
| 2006/0238336 A1 | 10/2006 | Zajac et al. | |
| 2009/0071645 A1 | 3/2009 | Kenison et al. | |
| 2009/0311107 A1 | 12/2009 | Chavez Zapata | |
| 2011/0074334 A1 | 3/2011 | Wang et al. | |
| 2012/0020808 A1 | 1/2012 | Lawson et al. | |
| 2012/0112546 A1 | 5/2012 | Culver | |
| 2012/0135629 A1 | 5/2012 | Montena | |
| 2015/0345280 A1 | 12/2015 | Krauss | |

FOREIGN PATENT DOCUMENTS

| | | |
|---|---|---|
| CN | 201159059 Y | 12/2008 |
| CN | 102434147 A | 5/2012 |
| CN | 202417478 U | 9/2012 |
| CN | 102966346 A | 3/2013 |
| GB | 2475074 A | 5/2011 |
| GB | 24750574 A | 5/2011 |
| WO | 2010/114916 A1 | 10/2010 |
| WO | 2014098873 A1 | 6/2014 |

OTHER PUBLICATIONS

Klimitchek, Randal, et al., Integrated rod-pump controller cuts operating costs, Petroleum Technology Digest for Independent Producers, reprinted from World Oil, Oct. 2003, pp. 1-2.

Weatherford, WellPilot—ePIC Intelligent VSD / RPC User Manual, Jul. 2010, Revision B, Table of Contents and "Polished Rod Load Cell Sensor TDS" and "Beam Mounted Load Sensor TDS" portions of Section 6.

USPTO Office Action dated Apr. 21, 2016 in related technology U.S. Appl. No. 14/467,574.

PCT Notification of Transmittal of the International Search Report and the Written Opinion of the International Searching Authority dated Oct. 12, 2015 in counterpart PCT/IB2015/053311.

USPTO Office Action dated Oct. 17, 2016 in related technology U.S. Appl. No. 14/547,345.

Transmittal of the International Preliminary Report on Patentability and the Written Opinion of the International Searching Authority dated Nov. 8, 2016 in PCT/IB2015/053311.

USPTO Office Action dated Feb. 2, 2017 in technologically related U.S. Appl. No. 14/828,706.

\* cited by examiner

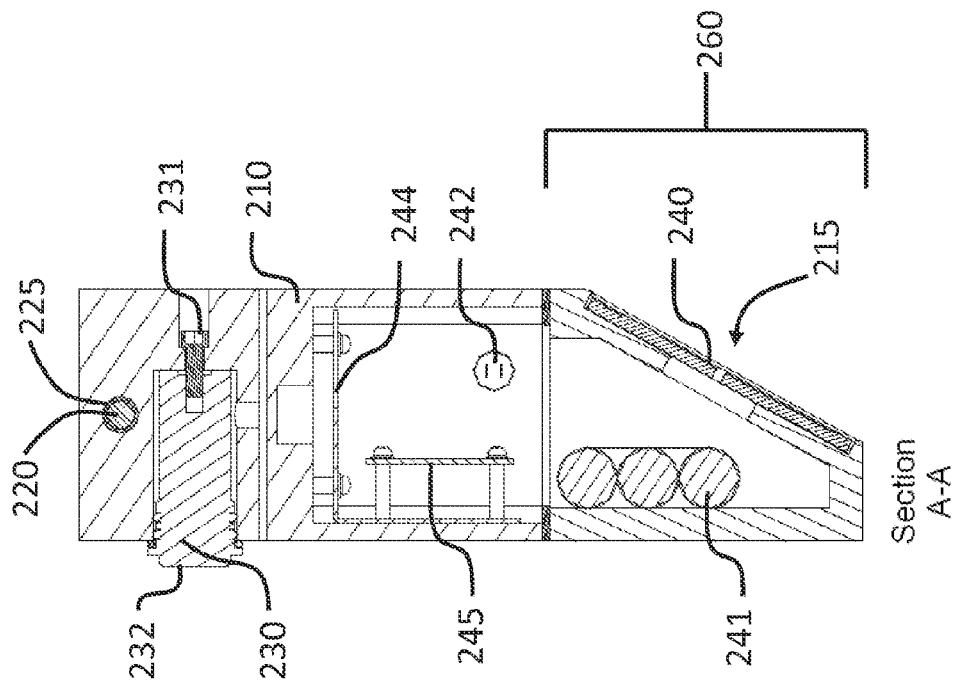
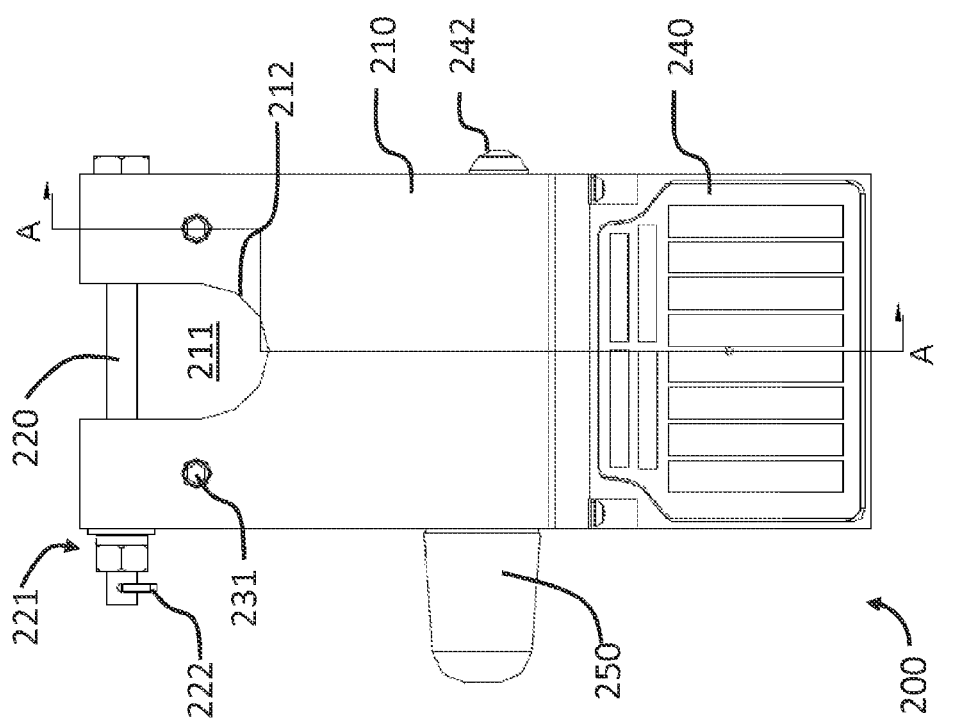

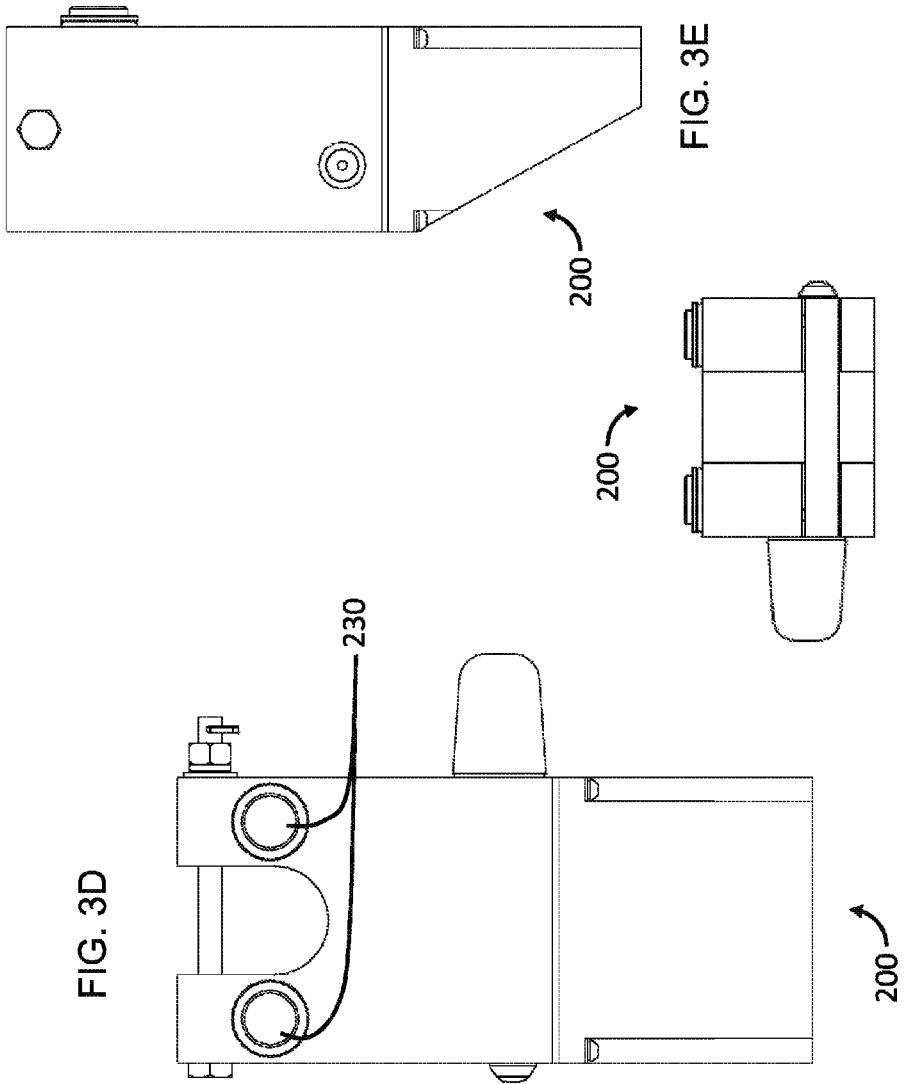

SOLAR BATTERY WIRELESS LOAD CELL

FIELD OF THE INVENTION

Embodiments of the present invention relate generally to rod pumping systems. For example, embodiments relate to an apparatus for measuring the load on a polished rod of a rod pumping system.

BACKGROUND

In the field of oil well rod pumping systems, it is desirable to monitor the strain (or "load") on the polished rod. In this way, malfunctions in the system can be detected and resolved to protect an oil pump from damage. Various solutions have been proposed for how to measure this force on the polished rod. For example, U.S. Pat. Pub. No. 2010/0020808 to Lawson et al. proposes two separate load cells that are "stacked" from the top of the polished rod and respectively measure an upward and a downward force on the polished rod. In order to measure the total force acting on the polished rod, the load cells encircle the polished rod in a ring shape, and are "stacked" at installation. Installation and maintenance of the load cells is therefore a complex process that requires sequential adding or removing the load cells from the top of the polished rod. Furthermore, designs such as Lawson's require multiple load cells in order to measure the respective upward and downward forces on the polished rod. Because it requires multiple load cells, this design is relatively expensive, and because of its need for the load cells to encircle the polished rod, this design makes installation and maintenance of the load cells a time-consuming process. Additionally, Lawson separates the load cells from the devices that power, process, and wirelessly transmit the measured load data. This further increases the cost and complexity of production and maintenance.

In other art, such as U.S. Pat. No. 7,513,752 to Boone et al., monitoring devices rely on indirect measurements that may roughly correlate to the force on the polished rod. For example, Boone discloses a monitoring device with an external scissor-like attachment hooked around the harness cables, asserting that a measurement of the restoring force tending to return the cables to their non-displaced position is generally proportional to the tension in the cables. However, this sort of measurement may be relatively inaccurate, and the scissor-like attachment of Boone is necessarily external to the monitoring device, thereby being affected by the outdoor elements and all of the maintenance issues associated therewith.

SUMMARY

A load cell is provided for transmitting load data of a polished rod in a rod pump system having a rod clamp fixed to a top of the polished rod and a clamping bar fixed to a hanger harness attached to a horsehead. The load cell includes an outer shell including a u-shaped structure having two protrusions, the u-shaped structure configured to receive the polished rod, and the outer shell configured to be positioned between the rod clamp and the clamping bar of the rod pump system; a load sensor configured to receive a voltage and output a load signal based on a load experienced by the load sensor; a load signal processor configured to receive and process the load signal from the load sensor and to output load signal data representative of the load experienced by the load sensor, wherein the load signal processor is internal to the outer shell of the load cell; a modulator configured to receive the load signal data from the load signal processor, to modulate the load signal data, and to output the modulated load signal data, wherein the modulator is internal to the outer shell of the load shell; a wireless transmitter configured to receive the modulated load signal data from the modulator and to wirelessly transmit the modulated load signal data; a solar battery configured to provide power to the load cell, the solar battery including: a solar panel that is mounted externally on the outer shell of the load cell; a battery that is internal to the outer shell of the load cell; a charger that is internal to the outer shell of the load cell and that is electrically connected to the solar panel and the battery, wherein the charger is configured to receive current from the solar panel and to charge the battery; and wherein the solar battery is configured to provide the voltage to the load sensor.

A method of attaching a load cell to a polished rod in a rod pump system is provided. The rod pump system has a rod clamp fixed to a top of the polished rod and a clamping bar fixed to a hanger harness attached to a horsehead. The method includes providing a gap between the polished rod clamp and the clamp bar, the gap sizeable to laterally receive the load cell, wherein the load cell includes an outer shell including a u-shaped structure having two protrusions, and wherein the outer shell of the load cell includes a hole in each of the two protrusions of the u-shaped portion, the holes configured to receive a fixing bar that thereby secures the load cell to the polished rod; laterally placing the load cell within the gap such that the u-shaped portion of the load cell receives the polished bar; and securing the load cell to the polished bar by inserting the fixing bar in the holes of the two protrusions of the u-shaped portion. The load cell further includes: the u-shaped structure configured to receive the polished rod, and the outer shell configured to be positioned between the rod clamp and the clamping bar of the rod pump system; a load sensor configured to receive a voltage and output a load signal based on a load experienced by the load sensor; a load signal processor configured to receive and process the load signal from the load sensor and to output load signal data representative of the load experienced by the load sensor, wherein the load signal processor is internal to the outer shell of the load cell; a modulator configured to receive the load signal data from the load signal processor, to modulate the load signal data, and to output the modulated load signal data, wherein the modulator is internal to the outer shell of the load shell; a wireless transmitter configured to receive the modulated load signal data from the modulator and to wirelessly transmit the modulated load signal data; a solar battery configured to provide power to the load cell, the solar battery including: a solar panel that is mounted externally on the outer shell of the load cell; a battery that is internal to the outer shell of the load cell; a charger that is internal to the outer shell of the load cell and that is electrically connected to the solar panel and the battery, wherein the charger is configured to receive current from the solar panel and to charge the battery; and wherein the solar battery is configured to provide the voltage to the load sensor.

BRIEF DESCRIPTION OF THE DRAWINGS

The accompanying drawings, which are included to provide a further understanding of embodiments of the invention and are incorporated in and constitute a part of this specification, illustrate embodiments of the invention that together with the description serve to explain the principles of embodiments of the invention. Throughout the drawings, same or similar reference numbers may be used to indicate same or similar parts. In the drawings:

FIG. 3A illustrates a top view of a load cell according to an embodiment of the present invention;

FIG. 3B illustrates a cross-section of the load cell at A-A of FIG. 3A;

FIG. 3C is a side view of the load cell of FIG. 3A;

FIG. 3D is a bottom view of the load cell of FIG. 3A;

FIG. 3E is another side view of the load cell of FIG. 3A;

DETAILED DESCRIPTION

Reference will now be made in detail to embodiments of the present invention, examples of which are illustrated in the accompanying drawings. It is to be understood that the figures and descriptions included herein illustrate and describe elements that may be of particular relevance to the present invention, while eliminating, for purposes of clarity, other elements found in typical rod pumping systems or methods.

Figure 1:
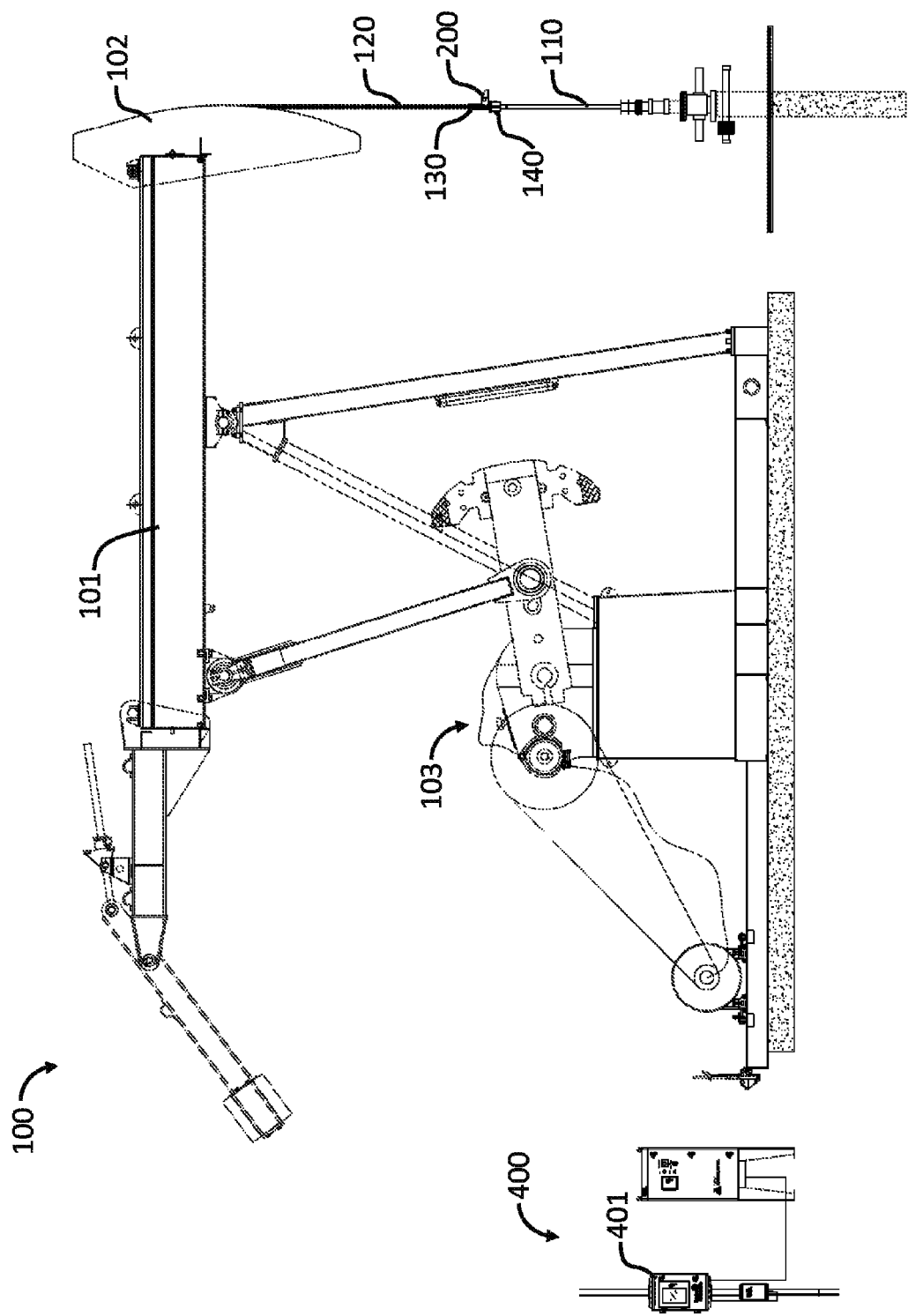
FIG. 1 illustrates an example rod pumping system together with an embodiment of a load cell of the present invention.

FIG. 1 illustrates a rod pumping system 100 which may be used to pump oil and whose mechanisms are generally known in the art, together with an embodiment of a load cell 200 of the present invention. As is known in the art, the example rod pumping system 100 includes a walking beam 101, horsehead 102, motor and gear drive 103, hanger harness 120, polished rod 110, polished rod clamp 130, and clamping bar 140. As the horsehead 102 moves up and down during operation of the rod pumping system 100, so do the hanger harness 120 and polished rod 110. As will be shown in FIG. 2B, the load cell 200 is positioned to measure axial forces on the polished rod 110 during this operation.

Figure 2B:
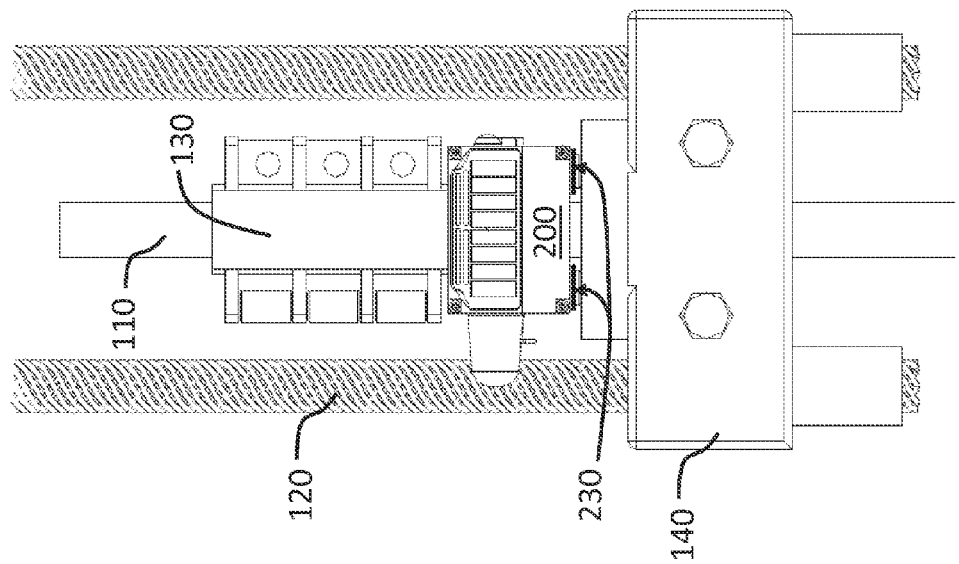
FIG. 2B illustrates a load cell of an embodiment of the present invention installed within the connection system of FIG. 2A.
Figure 2A:
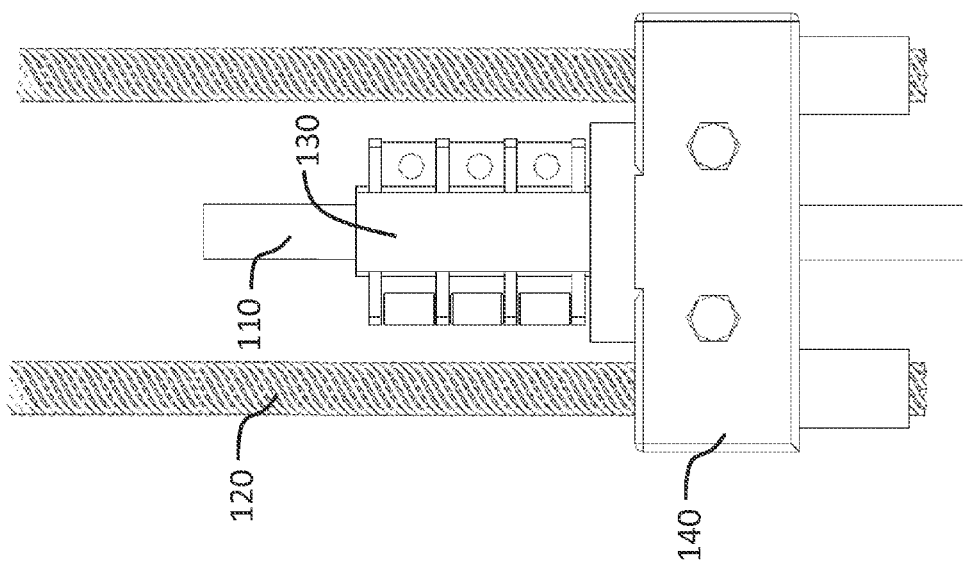
FIG. 2A illustrates a connection system between a harness and a polished rod of the rod pumping system before installation of the load cell.
Figure 2C:
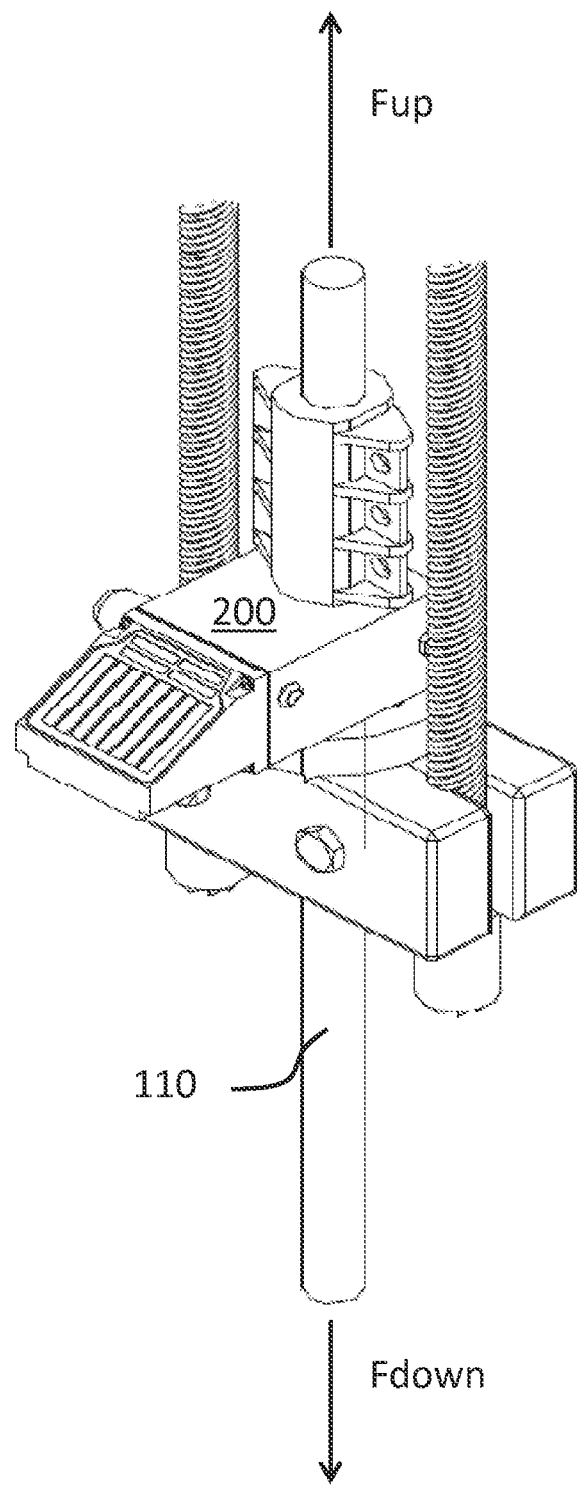
FIG. 2C illustrates a perspective view of the system of FIG. 2 and includes example forces acting upon the polished rod of a rod pumping system.
Figure 2D:
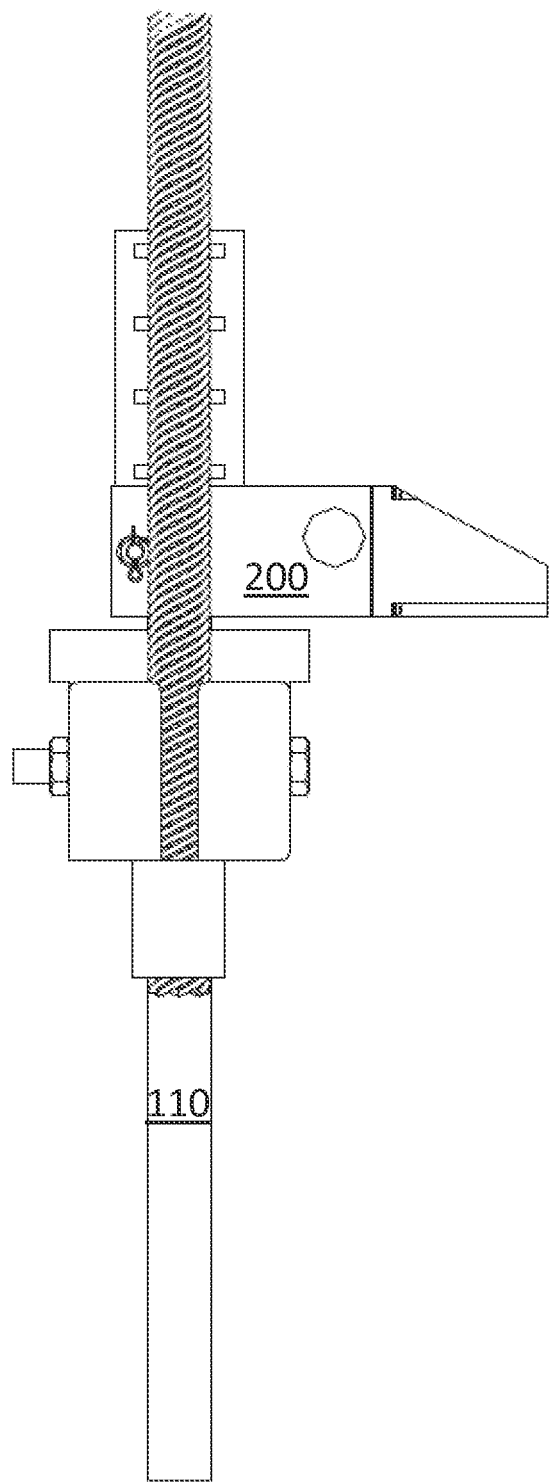
FIG. 2D illustrates a side view of FIG. 2B.

FIG. 2A shows an example of a hanger harness 120 and polished rod 110 connection system, as may be used in the rod pumping system 100 of FIG. 1. The hanger harness 120 may be formed of materials known in the art, including, for example, rope or metal cable, and may connect to the horsehead 102 of the pumping system 100 as shown in FIG. 1. As the pumping system operates, the polished rod 110 may be subject to both an axially upward force or strain $F_{up}$ and an axially downward force or strain $F_{down}$ (see FIG. 2C). The polished rod clamp 130 may be fixed to the polished rod 110 and may thereby maintain the connection between the polished rod 110, the hanger harness 120 and the clamping bar 140.

As shown in FIG. 2B, the load cell 200 may be configured such that it is easily placed between the existing clamping bar 140 and polished rod clamp 130 of the rod pumping system 100 without requiring the removal of the polished rod clamp 130. For example, a gap may be provided between the polished rod clamp 130 and the clamp bar 140, and the load cell 200 may be laterally placed within this gap such that a u-shaped portion of the load cell (discussed below) receives the polished bar 110.

This single load cell 200 may thereby directly measure the combined upward and downward forces $F_{up}$ and $F_{down}$ (see FIG. 2C) exerted on the polished rod 110 through transducer(s)/load sensor(s) 230, which will be described in more detail with reference to later figures. This ability to directly measure the forces on the polished rod 110 enables the load cell to measure the load more accurately than in the related art. Furthermore, as will be discussed below, the load cell 200 may be capable of independently providing power to itself and may internally include all the circuitry necessary to process the reading from transducer 230 and wirelessly transmit the resulting load signal to a receiver or other monitoring system.

FIG. 3A shows a top view of a load cell 200 according to an embodiment of the present invention. This load cell 200 may include an outer shell 210 having a u-shaped portion 211 formed by a gap in the outer shell 210. The u-shaped portion 211 may have two laterally protruding portions and may be sized to receive the polished rod 110 when the load cell 200 is installed in a rod pumping system. In example embodiments, the outer shell is made of metal. The u-shaped portion 211 of the outer shell 210 may have a surface 212 that is continuously smooth. After the u-shaped portion 211 of the load cell 200 is placed around the polished rod 110 at installation, the load cell 200 may be laterally secured to the polished rod 110 with fixing bar 220. For example, fixing bar 220 may be inserted in holes 225 of the laterally protruding portions of the u-shaped portion 211. Fixing bar 220 may be or resemble a bolt and may be secured to the load cell 200 by use of a nut and/or washer 221. In a preferred embodiment and for additional security, the fixing bar 220 may be further secured to the load cell 200 with a cotter pin 222.

The load cell 200 in accordance with embodiments of the present invention is designed to be relatively maintenance free. However, if the load cell 200 needs to be removed from the rod pumping system 100 for any reason, this can easily be done by first removing the fixing bar 220 and then removing load cell 200 laterally from the polished rod 110.

With reference to FIGS. 3B and 3D, the load cell 200 may include two transducers (also herein referred to as "load sensors") 230 with flat bottom surfaces 232 that protrude on the bottom side of the load cell 200 and are configured to make physical contact with the clamping bar 140, as shown for example in FIG. 2A. In example embodiments, because the structure of the load cell 200 is such that it can be placed between this clamping bar 140 and the hanger harness 130, the transducers 230 of a single load cell 200 can measure both upwards and downwards axial forces exerted on the polished rod 110. The load cell 200 may be configured such that when it is installed, the flat surfaces 232 of the transducers 230 are flush with the clamping bar 140, and a top surface of the outer shell 210 is flush with the polished rod clamp 130. In this way, the forces acting upon the load cell 200 may accurately and directly reflect the forces acting upon the polished rod 110.

By application of an input voltage, the transducers 230 may convert the forces they experience into electrical signals. These transducers 230 may be, for example, strain gauge transistors, which can change resistance based on the strain they experience. However, other types of transducers may be used. For example, in some embodiments, the transducers may be of semiconductor type.

Figure 4:
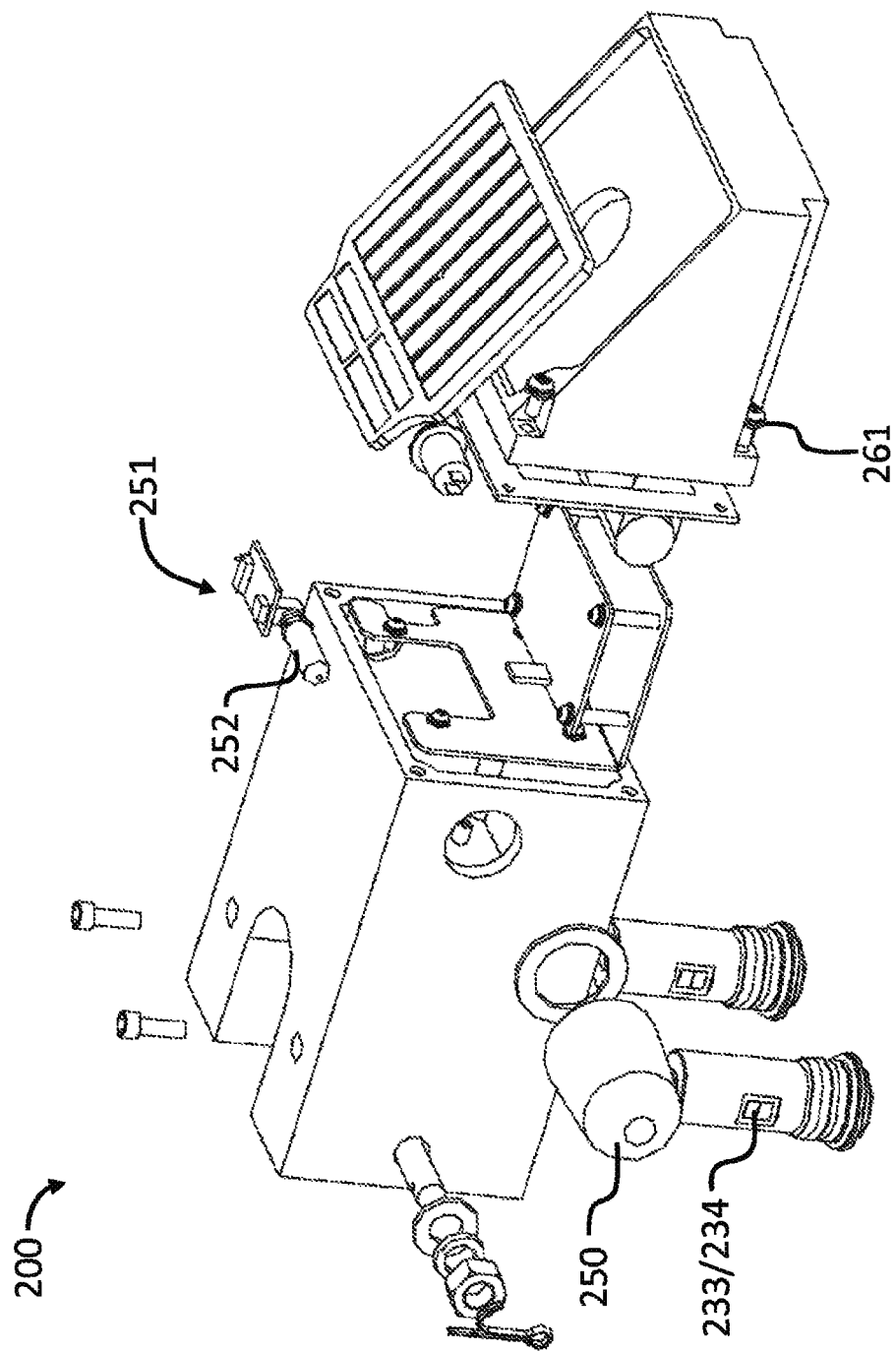
FIG. 4 illustrates an exploded view of a load cell according to an embodiment of the present invention.

With reference to FIG. 4, the transducers 230 may receive input voltage (power) and output a voltage reading that varies based on strain. For example, strain gauges 233 and 234 of the transducers 230 may detect the deformation of the metal elements of the transducers 230 due to an applied force, and send a signal corresponding to this deformation so as to detect the variation of the applied force. Furthermore, as will be discussed below, the transducers may receive voltage from a power source integrated inside the outer shell 210 of the load cell 200, thereby eliminating the need for an external power source.

With reference to FIG. 3D, in a preferred embodiment, the two transducers 230 are cylindrically shaped and are diametrically opposed across the gap forming the u-shaped portion 211 relative to a position of the polished rod 110. This placement of the two transducers 230 may allow them to measure the entire upward and downward force exerted on the polished rod 110 without the need to completely encircle the polished rod 110, as in related art. Because the transducers do not need to encircle the polished rod 110, this placement also allows the load cell 200 to be easily installed in an existing rod pumping system without having to "stack" the load cell 200 from the top of the polished rod.

The transducers 230 may be placed at the bottom of the load cell 200, as shown for example in FIG. 3B. This placement at the bottom of the load cell 200 may protect the transducers from the outdoor elements. Meanwhile, in a preferred embodiment, the transducers 230 are centered and secured by bolts 231, which are inserted from the top of the load cell 231. In one embodiment, these bolts 231 may be hexagon bolts such as those having international grade number GB/T70.1.

In some embodiments, outer shell 210 of the load cell 200 includes a slanted portion 215. This slanted portion 215 may include solar panel(s) 240 for providing power to the load cell. In contrast to other elements of the load cell 200, the solar panels 240 may be mounted externally on the outer shell 210. In one embodiment, the solar panels 240 may be connected in parallel to a charger and an electrical power storage 241 such as a battery. Furthermore, the solar panels 240, power storage 241, a charger and load signal processor on circuit board 245, and a wireless transmitter 251 (see FIG. 4) may be successively connected in parallel, as will be discussed in more detail below with regard to the embodiment shown in FIG. 5. Structure 244 may provide support for the circuit board 245. The solar panels may produce current from incident light.

With reference to FIGS. 3B and 4, the slanted portion 215 of the load cell 200 including at least the solar panels 240 and power storage 241 may form a power supply unit 260. In some embodiments, this power supply unit 260 may be easily attachable and detachable from the rest of the load cell 200 through use of bolts 261. In this way, the load cell 200 can provide an integrated, encapsulated package that has all the desired functionality while still allowing the power storage/battery 241 to be easily replaced as it ages.

With respect to FIG. 4, in some embodiments, the wireless transmitter 251 is mounted inside the outer shell 210 and includes an antenna 252 that protrudes outside the outer shell and that is protected from the outdoor elements by an antenna cover 250. This antenna cover 250 may be plastic or another material that limits interference with wireless signals. The wireless transmitter 251 may transmit load data to, for example, a nearby receiver, station, or other device that can monitor the measured load on the polished rod 110. For example, with reference to FIG. 1, the wireless transmitter 251 may transmit modulated load signal data to a wireless load cell receiver module 401 connected to a rod pump controller 400 in order that the rod pumping system 100 may be appropriately controlled in the event of an excess load on the polished rod 110.

In some embodiments, the load cell 200 also includes a switch 242. This switch 242 may be used to turn on/off power to the load cell 200. For example, during shipping and storage, the switch 242 can be used to turn off power to the load cell 200 to save battery life.

Figure 5:
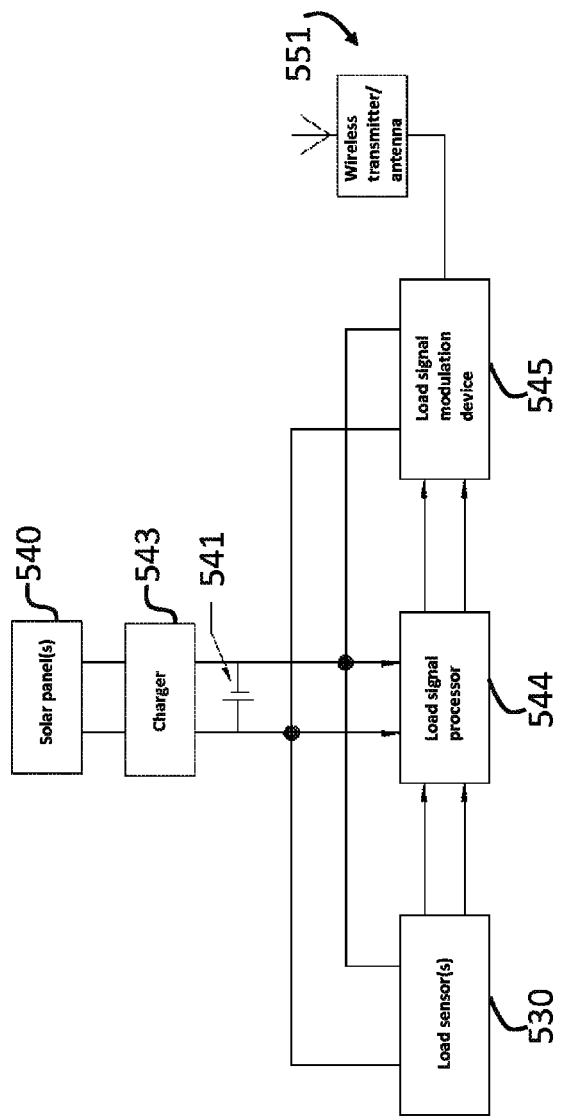
FIG. 5 illustrates a block diagram of circuitry according to an embodiment of the present invention.
Figure 6:
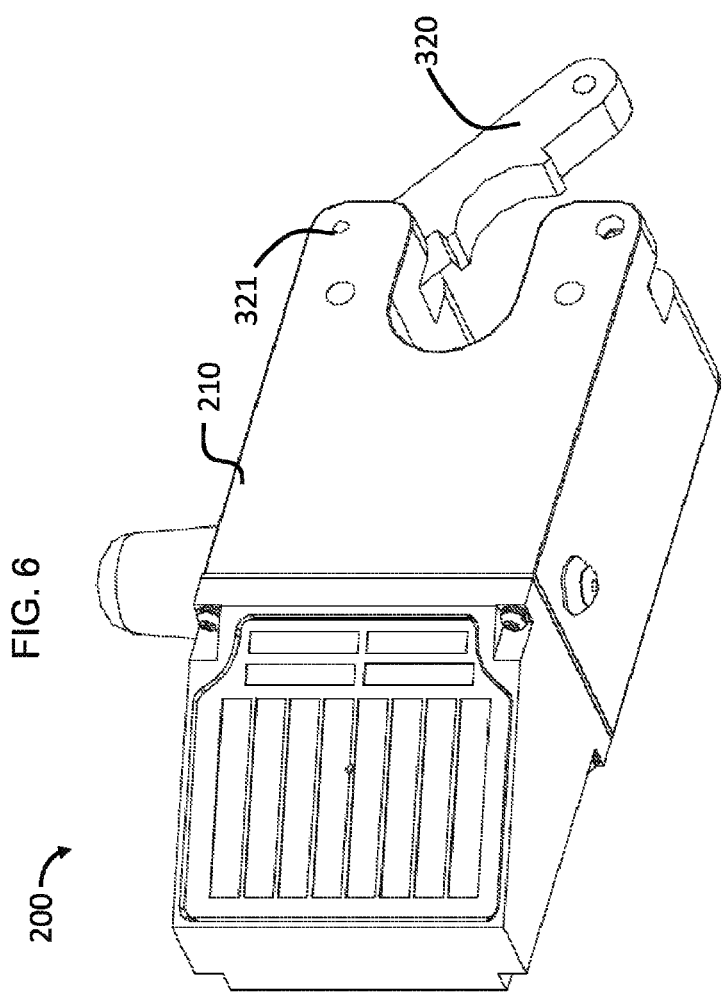
FIG. 6 illustrates a load cell according to an embodiment of the present invention.
Figure 7C:
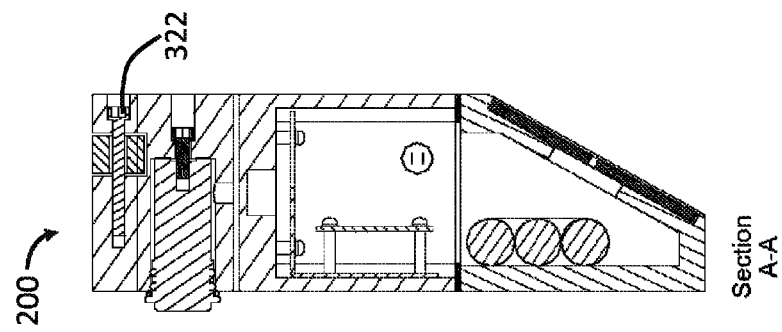
FIG. 7C illustrates a cross-section of the load cell at A-A of FIG. 7B.
Figure 7B:
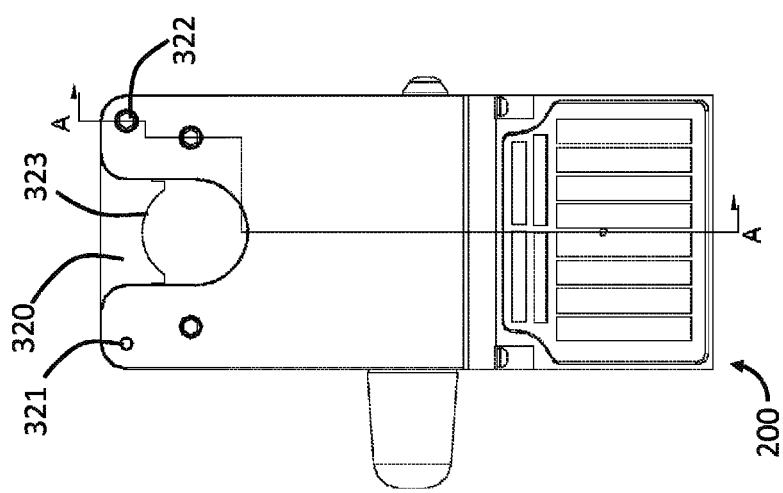
FIG. 7B illustrates a top view of the load cell of FIG. 6.
Figure 7A:
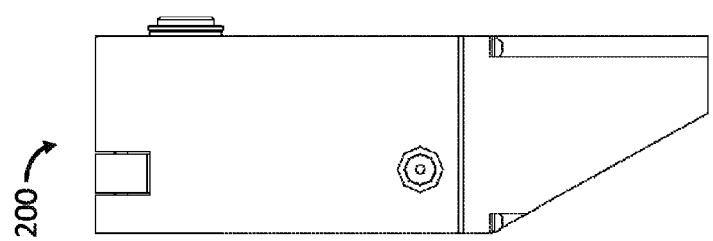
FIG. 7A illustrates a side view of the load cell of FIG. 6.

FIG. 5 illustrates a schematic circuit configuration of the solar battery wireless load cell according to some embodiments of the invention. The circuit configuration may include solar panel(s) 540, a charger 543, a power storage/battery 541, a load signal processor 544, a load signal modulation device 545, a wireless transmitter/antenna 551, and load sensor(s) 530. While FIG. 5 shows load signal modulation device 545 separate from the wireless transmitter 551, in some embodiments, the load signal modulation device 545 may be included as part of the wireless transmitter 551. Furthermore, in some embodiments, the modulation device 545 or wireless transmitter 551 can include an amplifier. In some embodiments, the charger 543 may be included on the same circuit board as circuitry for the load signal modulation device 545 and/or load signal processor 544. The solar panel 540 is used to generate and supply electricity to the load cell, and may comprise a set of solar photovoltaic modules electrically connected and mounted to an outer shell of the load cell. The solar panel 540 may be connected to the charger 543 and the power storage/battery 541. The charger 543 may receive current from the solar panel 540 and charge the power storage/battery 541 with energy based on this current. The power storage/battery 541 is further connected to the load signal processor 544, the load signal modulation device 545, and the load sensors 530 to supply power to those elements. The load sensors 530 may be configured to measure and transmit load signals to the load signal processor 544. The load signal processor 544 may receive the load signals from the load sensors 530, calculate a load experienced by the polished rod 110 based on these load signals, and output this processed load signal data. For example, the load signal processor 544 may perform this calculation based on a recognition that the load experienced by the polished rod 110 is proportional to the sum of the load signals from both load sensors 530. The processed load signal data may be further transmitted to the load signal modulation device 545 (which, in some embodiments, is included in wireless transmitter 551) to perform signal modulation. After the load signal data is processed and modulated, it may be amplified and transmitted via the wireless transmitter/antenna 551. In embodiments of the present invention, as the solar panel 540 supplies power to the charger 543 and the power storage/battery 541, any electric cable connected to an exterior power source is eliminated. Therefore, embodiments in accordance with the present invention may improve the energy efficiency and facilitate the maintenance of the load cell equipment. In embodiments of the invention, the above circuitry may include non-transitory computer readable storage mediums for providing appropriate instructions to the processor(s). In some embodiments of the invention, a special signal processing application is used in order to decrease energy loss.

With reference to FIGS. 6 and 7A-7C, in one embodiment of the invention, the load cell 200 may be secured to the polished rod 110 with a hinged latch 320. The latch 320 may be hinged on outer shell 210 with a hinge 321. The latch 320 may thus be capable of opening and closing using this hinge 321 as a pivot point, and the other end of the latch 320 may be secured to the load cell 200 when in a "closed" position with a bolt 322. Furthermore, the latch 320 may include an arced portion 323 that, together with the u-shaped portion 211 of the load cell 200, encircles the polished rod 110 in a roughly circular shape. This design may even further simplify installation of the load cell 200 on the polished rod 110.

Any reference in the specification to "one embodiment" or "an embodiment" means that a particular feature, structure or characteristic described in connection with the embodiment is included in at least one embodiment of the invention. The appearances of the phrase "in one embodiment" at various places in the specification do not necessarily all refer to the same embodiment.

Embodiments set forth below correspond to examples of load cell implementations of the present invention. However, the various teachings of the present invention can be applied in more than the embodiments set forth below as would be recognized by one skilled in the art.

As will be appreciated by those skilled in the art, changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A load cell for transmitting load data of a polished rod in a rod pump system having a rod clamp fixed to a top of the polished rod and a clamping bar fixed to a hanger harness attached to a horsehead, the load cell comprising:
   an outer shell including a u-shaped structure having two protrusions, the u-shaped structure configured to receive the polished rod, and the outer shell configured to be positioned between the rod clamp and the clamping bar of the rod pump system;
   a load sensor configured to receive a voltage and output a load signal based on a load experienced by the load sensor;
   a load signal processor configured to receive and process the load signal from the load sensor and to output load signal data representative of the load experienced by the load sensor, wherein the load signal processor is internal to the outer shell of the load cell;
   a modulator configured to receive the load signal data from the load signal processor, to modulate the load signal data, and to output the modulated load signal data, wherein the modulator is internal to the outer shell of the load cell;
   a wireless transmitter configured to receive the modulated load signal data from the modulator and to wirelessly transmit the modulated load signal data;
   a solar battery configured to provide power to the load cell, the solar battery including:
      a solar panel that is mounted externally on the outer shell of the load cell;
      a battery that is internal to the outer shell of the load cell;
      a charger that is internal to the outer shell of the load cell and that is electrically connected to the solar panel and the battery,
      wherein the charger is configured to receive current from the solar panel and to charge the battery; and
   wherein the solar battery is configured to provide the voltage to the load sensor.

2. The load cell of claim 1, wherein
   the load sensor includes two load sensors, each of the two load sensors having a bottom that protrudes from a bottom of the load sensor to thereby physically contact a clamping bar of the rod pump system.

3. The load cell of claim 2, wherein
   the bottoms of each of the two load sensors are planar; and
   the two load sensors are diametrically opposed to each other across the u-shaped portion of the load cell relative to a position of the polished rod when the load sensor is installed in the rod pump system.

4. The load cell of claim 1, the load cell further comprising a bolt inserted from a top of the load cell and positioned to center the load sensor.

5. The load cell of claim 1, wherein the outer shell of the load cell includes a hole in each of the two protrusions of the u-shaped portion, the holes configured to receive a fixing bar that thereby secures the load cell to the polished rod.

6. A method of attaching a load cell to a polished rod in a rod pump system, the rod pump system having a rod clamp fixed to a top of the polished rod and a clamping bar fixed to a hanger harness attached to a horsehead, the method comprising:
   providing a gap between the polished rod clamp and the clamp bar, the gap sizeable to laterally receive the load cell, wherein the load cell includes an outer shell including a u-shaped structure having two protrusions, and wherein the outer shell of the load cell includes a hole in each of the two protrusions of the u-shaped portion, the holes configured to receive a fixing bar that thereby secures the load cell to the polished rod;
   laterally placing the load cell within the gap such that the u-shaped portion of the load cell receives the polished bar; and
   securing the load cell to the polished bar by inserting the fixing bar in the holes of the two protrusions of the u-shaped portion,
   wherein the load cell further includes:
      the u-shaped structure configured to receive the polished rod, and the outer shell configured to be positioned between the rod clamp and the clamping bar of the rod pump system;
      a load sensor configured to receive a voltage and output a load signal based on a load experienced by the load sensor;
      a load signal processor configured to receive and process the load signal from the load sensor and to output load signal data representative of the load experienced by the load sensor, wherein the load signal processor is internal to the outer shell of the load cell;
      a modulator configured to receive the load signal data from the load signal processor, to modulate the load signal data, and to output the modulated load signal data, wherein the modulator is internal to the outer shell of the load cell;
      a wireless transmitter configured to receive the modulated load signal data from the modulator and to wirelessly transmit the modulated load signal data;

a solar battery configured to provide power to the load cell, the solar battery including:
  a solar panel that is mounted externally on the outer shell of the load cell;
  a battery that is internal to the outer shell of the load cell;
  a charger that is internal to the outer shell of the load cell and that is electrically connected to the solar panel and the battery,
  wherein the charger is configured to receive current from the solar panel and to charge the battery; and
wherein the solar battery is configured to provide the voltage to the load sensor.

\* \* \* \* \*